United States Patent [19]

Simonyi et al.

[11] Patent Number: 4,891,758
[45] Date of Patent: Jan. 2, 1990

[54] PROCESS AND APPARATUS FOR REALIZING SAFE START-UP SHIFTING AND ENERGY SAVING IDLING OF MOTOR VEHICLES PROVIDED WITH AUTOMATIC TRANSMISSIONS

[75] Inventors: Sándor Simonyi, Salgótarján; László Töröcsik, Budapest; György Válóczi, Salgótarján, all of Hungary

[73] Assignee: Csepel Autógyár, Szigetszenmiklós, Hungary

[21] Appl. No.: 146,521

[22] Filed: Jan. 21, 1988

[51] Int. Cl.⁴ .................. B60K 41/18; F16H 5/40
[52] U.S. Cl. .................. 364/424.1; 74/865; 74/866
[58] Field of Search .......... 364/424.1; 74/865, 866, 74/867, 868, 869; 192/0.044, 0.052, 0.055

[56] References Cited

U.S. PATENT DOCUMENTS

| | | | |
|---|---|---|---|
| 4,509,625 | 4/1985 | Tellert | 192/0.052 X |
| 4,526,065 | 7/1985 | Rosen et al. | 74/869 |
| 4,618,042 | 10/1986 | Yamamoto | 192/0.044 |
| 4,633,985 | 1/1987 | Leorat | 192/0.055 |
| 4,637,278 | 1/1987 | Nishikawa et al. | 74/866 |
| 4,643,048 | 2/1987 | Hattori et al. | 74/866 |
| 4,653,622 | 3/1987 | Miyake | 192/0.052 |
| 4,709,792 | 12/1987 | Sakai et al. | 192/0.044 |

FOREIGN PATENT DOCUMENTS 2126291  3/1984  United Kingdom.

Primary Examiner—Felix D. Gruber
Attorney, Agent, or Firm—Schweitzer & Cornman

[57] ABSTRACT

A control system for an automatic transmission, which prevents start-up shifting unless safe conditions exist. Sensors detect engine speed, vehicle speed, shift selection, and throttle position. For start-up shifting to be enabled, engine speed must be at idle, vehicle speed near zero, a start-gear selected, and the throttle initially at rest. Thereafter, displacement of the throttle from its rest position enables a shift command to be forwarded to the transmission to effectuate the shift selection. In a further embodiment, start-up shifting with the vehicle in motion is enabled, provided the direction of motion is consistent with the start-up gear selection. When the throttle is released, with the vehicle in motion, the transmission shift control is disabled, shifting the transmission into "neutral", when vehicle speed drops below a predetermined level, allowing the vehicle to free wheel, without being dragged forward by the idling engine.

6 Claims, 3 Drawing Sheets

PROCESS AND APPARATUS FOR REALIZING SAFE START-UP SHIFTING AND ENERGY SAVING IDLING OF MOTOR VEHICLES PROVIDED WITH AUTOMATIC TRANSMISSIONS

BACKGROUND AND SUMMARY OF THE INVENTION

The invention relates to a process and an apparatus which prevents a motor vehicle, generally used in vehicular traffic and provided with an electrohydraulically controlled automatic transmission, from being shifted into a running gear before requirements of safe shifting are met. The invention also assures that the lowest fuel consumption can be achieved, if the motor vehicle is waiting with a running motor.

With certain motor vehicles provided with automatic transmissions, it is possible to switch the shift controller into position to obtain the required gear change, quite independently of the actual running state of the motor vehicle and the number of revolutions of the motor. If the driver brakes the vehicle while shifting into a running gear, accidents can be avoided by overcoming the dragging force of the hydrodynamic torque converter. However, this involves energy losses.

Up to now the problem has been dealt with by connecting the hydraulic lines for actuating the clutches of the starting stages (i.e., low, reverse) of the automatic transmission, with the return via separate lines, each with an electromagnetic valve. Such an arrangement is specified, e.g., in the GB-PS No. 2 126 291. With this solution, a prerequisite of closing said electromagnetic valve is that requirements of safe start-up shifting should be met. The drawback of the solution, however, is that practically a second actuating and controlling system must be provided for the starting stages of the transmission.

The aim of the invention is to develop a control system for the automatic transmission, which is able to prevent start-up shifting if the prerequisites of safe shifting are not established. That means that the second control system, mentioned above, is not required. According to the invention, the objective can be realized by providing signals, for controlling the electromagnetic valves for switching the start-up stages which are influenced by the conditions of safe start-up shifting.

A further objective of the invention is that during waiting time the motor vehicle should consume the minimum quantity of fuel. This requirement can be met so, that with the gas pedal released, and with a very small decelerating motion of the vehicle, the automatic transmission is switched to neutral.

When realizing the process according to the invention, the proceeding takes place in the following manner:

Sensors are provided for detecting (a) the motion of the vehicle, (b) the speed of the engine, and (c) the position of the throttle (fuel pedal). When, in combination, vehicle speed is near zero, engine speed is near idle speed, and the throttle is released, a first shift-enabling signal is generated. Thereafter, by means of the gear selecting switch, a control signal is produced directing the switch of the automatic transmission into low speed or reverse gear, as selected by the user. Thereafter, by displacing the accelerating pedal from its "basic" or idle position, a command signal is transmitted when the enabling signal, the control signal and the command signal exist in combination, the switch signal is formed, by which the electrohydraulic valves are controlled to the desired switching position, thus shifting to the required gear of the automatic transmission.

With a preferred mode of realization of the process according to the invention, a signal is generated characterizing the direction of motion of the motor vehicle. By using said signal, the direction of motion of the motor vehicle is compared in the control unit with the starting direction selected by the gear selecting switch. If the direction of vehicle movement is in compliance with the direction of the selected start-up gear, the signal expressing near zero velocity of the vehicle is completed.

With another preferred mode of realization of the process according to the invention, when there are signals indicating the "idle" (released) position of the accelerator pedal, and indicating also the slowing motion of the motor vehicle to below a predetermined low level of velocity, the shift switching signal is interrupted. All stages of the automatic transmission are disconnected and the transmission returns to "neutral", so the vehicle can coast freely. Thereafter, by merely displacing the accelerator pedal from its basic ("idle") position, the automatic transmission is reactivated into the previously selected shift condition.

DESCRIPTION OF PREFERRED EMBODIMENTS

Figure 1:
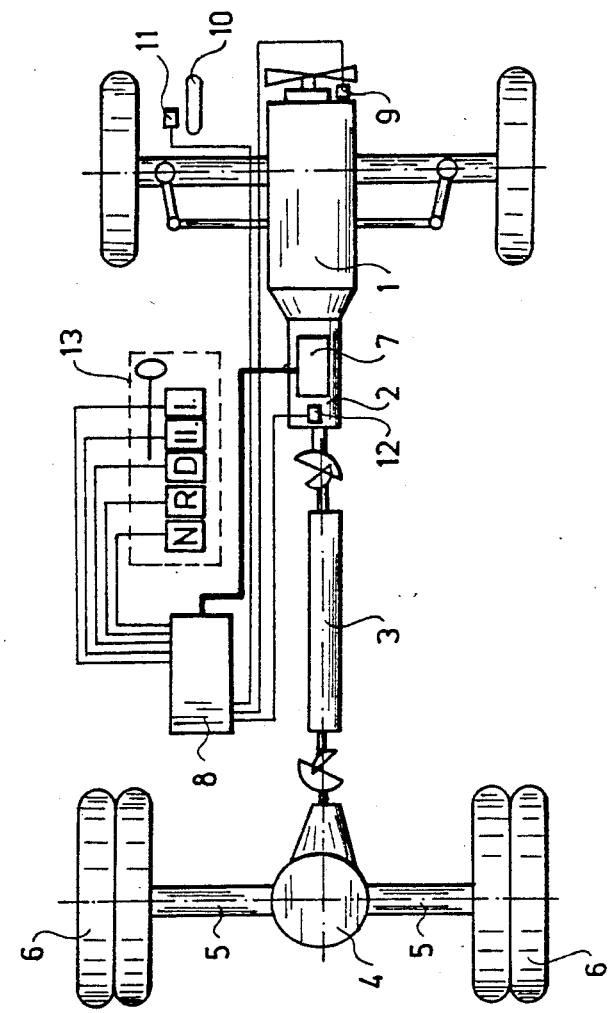
FIG. 1 is the schematic view of the connections between the drive train of the motor vehicle, the signal transmitters and the control units.

Based on our invention we prepared an apparatus for the control of the automatic transmission of a bus for city traffic.

The motor 1, in the present case a six-cylinder Diesel motor, represents the power source of the bus, which is driving an electrohydraulically controlled hydromechanic automatic transmission 2. The automatic transmission has three forward gears and one reverse gear.

The output shaft of the automatic transmission 2 is connected with the differential gear 4 via the transmission shaft 3, while the differential gear is connected with the wheels 6 through the differential shafts 5. For the sake of order it should be mentioned that our invention can be successfully applied with passenger cars. With cars having frontal drive or rear engines, the differential gear and transmission are assembled in one block. Accordingly, in these types there is no transmission shaft.

Gear change of the automatic transmission 2 is controlled by electromagnetic valves 7 of an electrohydraulic valve system. The electromagnets of the electromagnetic valves 7 are connected to the output of a control unit 8. The basic information needed for realizing the process according to the invention is supplied by signal transmitters.

The camshaft of the motor 1 carries a transmitter 9 for sending a signal representing the angular velocity of the motor. In consideration that between the camshaft of the motor and the crankshaft there is a constant gear ratio of 2:1, it will be quite obvious that number of revolutions of the camshaft can be well used as a signal of angular velocity of the motor.

The output of the automatic transmission 2 is connected to a transmitter 12 for sending a signal of the angular velocity of the wheels. In this case the output of the automatic transmission was used, which is simultaneously delivering the signal needed for the speedometer of the motor vehicle.

On the previously mentioned measuring points, the gear ratio between measured angular velocity and the angular velocity actually to be evaluated is compensated for in the control unit 8.

The accelerator pedal 10 is assembled with a signal transmitter 11 indicating the "basic" or released position of the accelerator pedal. This can be realized in different ways depending on the general control level of the motor vehicle.

In the most simple case, the signal of a double-throw switch can be used for this purpose.

The gear selecting switch 13 (controller) also represents a signal source, by which different gears can be selected.

The gear selecting switch, which can be quite diverse in respect to design (switch with a lever, or with push buttons, etc.) must be provided with means generating the proper signals (I, II, D, R, N) for switching to the different gears.

The previously described signal sources are connected to various inputs of the control unit 8. In particular, the transmitter 9 (angular velocity of the motor) is connected to the input 16 (see FIG. 2), the signal transmitter 11 (basic position of the accelerator pedal) to the input 17, and the signal transmitter 12 (angular velocity of the wheel) to the input 18. The terminal I of the gear selecting switch 13 is connected to the input 19, the II terminal to the input 20, terminal "D" to the input 21, and the terminal "R" to the input 22. From the point of view of the invention, the terminal "N" does not play any role.

Figure 2:
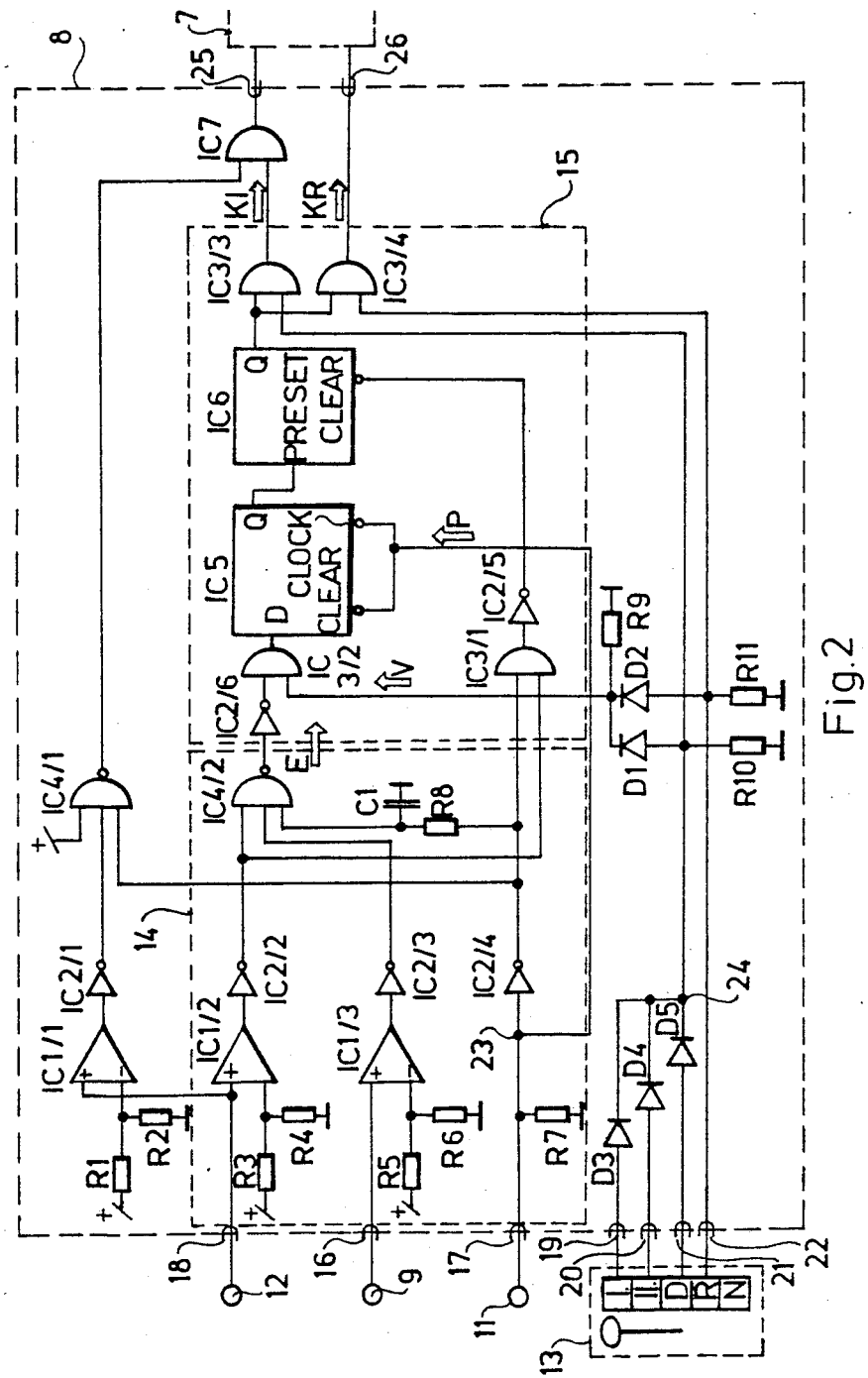
FIG. 2 shows the circuit arrangement of one of the embodiments of the apparatus according to the invention.

Possible design of the control unit 8 is illustrated in FIG. 2. The control unit comprises the following electronic elements: A quadruple comparator (LM 324) containing comparator units IC1/1–IC1/3, a sextuple invertor (SN 74 LS 04) comprising invertor units IC2/1–IC2/6, a quadruple AND-gate (SN 74 LS 38) with two inputs containing individual gates IC3/1–IC3/4, a NAND-gate (SN 74 LS 10) with 2×3 inputs containing individual units IC4/1–IC4/2, flip-flops (bistable circuits) IC5 and IC6 (type SN 74 LS 74 D) and a quadruple AND-gate with two inputs, wherein one single unit IC7 thereof has been utilized. Additionally, we used the diodes D1–D5 (1N 4148) and the resistors R1–R11.

For receiving the signal of the transmitter 9 (angular velocity of the motor) the input 16 is connected to one of the inputs of the comparator IC1/3, while the other input is connected to the positive pole of the supply voltage by means of a voltage divider consisting of the resistors R5–R6.

The output of the comparator IC1/3 is connected to one of the inputs of the NAND-gate IC4/2 via the invertor IC2/3.

The input 18, receiving the signal of the transmitter 12 (angular velocity of the wheel), is connected to one of the inputs of the comparator IC1/2, while the other input thereof is connected to the positive pole of the supply voltage through the voltage divider consisting of the resistors R3–R4, while its output is connected to the second input of the NAND gate IC4/2 via the invertor IC2/2.

The input 17, connected to the signal transmitter 11 (basic position of the accelerator pedal) is connected to the third input of the NAND gate IC4/2 via a distributing point 23, the invertor IC2/4 and the resistor R8. The input 17 is also connected through a resistor R7 to ground. A condenser C1 is inserted between the common point of the resistor R8 and the NAND gate IC4/2, on one side, and ground on the other.

This part of the control unit 8 forms the unit which generates the "enabling" signal.

The output of the NAND gate IC4/2 is connected to one of the inputs of the AND gate IC3/2 via the invertor IC2/6, while the other input receives the signal coming from the gear selecting switch 13 in the following manner:

From the terminals I, II, D and R of the gear selecting switch 13 a connection each is led to the inputs 19, 20, 21, 22 of the control unit 8. For the sake of order it should be mentioned that further connections (not shown) are led from said terminals to a different control unit (not shown) for actually effecting gear changing operations. For this reason, the task of the control unit 8 is limited to evaluating the intentions of the driver, i.e., whether he intends to start at all, and if so whether forwards or backwards. Accordingly, the inputs 19, 20, 21 connected to the terminals I, II and D are connected to a common connection point 24 (for forward travelling) through the diodes D3, D4, D5.

The connection point 24 (forward travel) is connected through the diode D1 to the other input of the AND gate IC3/2, while the input 22, connected to the terminal R, is connected to the same input of the AND gate via the diode D2. A common point between the connection point 24 and the diode D1 is connected through the resistor R10 to ground. Likewise a common point between the input 22 and the diode D2 is connected through the resistor R11 to ground. Further, a common point between the diodes D1 and D2 is connected to ground through the resistor R9.

The output of the AND gate IC3/2 is connected to the data-input of the flip-flop IC5. The cancelling and clock signal input of the flip-flop IC5 is connected to the distributing point 23, which again is connected to the signal transmitter 11 (basic position of the accelerator pedal).

The output of the flip-flop IC5 is connected to the write-in input of the flip-flop IC6. The cancelling input of the flip-flop IC6 is connected through the invertor IC2/5 to the output of the AND gate IC3/1, while the inputs of IC3/1 are connected to the outputs of the invertors IC2/2 and IC2/4.

The output of the flip-flop IC6 is connected to an input of each of two AND gates IC3/3 and IC3/4. Another input of the AND gate IC3/3 is connected to the connection point 24 (forward travel), while the other input of the AND gate IC3/4 is connected to the input 22, which is connected to the "reverse" terminal R. This part of the control unit 8 represents the unit 15 producing the "control" signal.

Theoretically, the outputs of the AND gates IC3/3 and IC3/4 could from the output of the control unit 8.

At the same time the output of the AND gate IC3/3 is connected to one of the inputs of a further AND gate IC7, while the other input thereof is connected to the input 18 receiving the signal of the transmitter 12 (angular velocity of the wheel), in a way as detailed below:

The input 18 is connected to one of the inputs of the comparator IC1/1 and the other input thereof is connected to the positive pole of the supply voltage via the voltage divider consisting of the resistors R1–R2. The output of the amplifier IC1/1 is connected through the invertor IC2/1 to one of the inputs of the NAND gate IC4/1, while further inputs thereof are connected to the output of the invertor IC2/4 and with the positive pole of the supply voltage, while the output is connected to the input of the AND gate IC7. The output of the AND gate IC7 forms the output 25 of the control unit 8, while the output of the AND gate IC3/4 forms the output 26 of the control unit 8. Output 25 is connected to one pole of the transmission solenoid valve producing "low" gear, while the output 26 is connected to one pole of the solenoid valve producing the "reverse" gear. The other poles of these solenoid valves are connected to the corresponding outputs of the unit controlling the gear shifting (not illustrated here).

Pursuant to the invention the apparatus functions as follows:

The driver starts the motor vehicle with the usual manipulations, as with any vehicle provided with a conventional transmission. After starting the motor 1, the gear selecting switch 13 is positioned in accordance with the planned direction of advance (forward-reverse) and with circumstances of traffic (load, rise, road condition, traffic, etc.). Thereafter, the accelerator pedal 10 is depressed.

The actions of the driver are evaluated by the apparatus in the following way:

Prior to starting, and after starting, up to reaching the number of revolutions of idling speed, the signal level of the transmitter 9 (angular velocity of the motor) is not sufficiently high for the control unit 8, and is accordingly evaluated as a non-signal (binary "0"). Similarly, the signal level of the transmitter 12 (angular velocity of the wheel), in the stationary or quasi-stationary state of the motor vehicle, is evaluated by the control unit as a non-existing signal. "Quasi-stationary" includes speeds under 1.5 km/h.

At start-up, the accelerator pedal occupies its basic (released) position. As a consequence, the transmitter 11 gives an inadequate signal, which is evaluated by the control unit 8 as a non-existing signal.

It should be understood that, from the point of view of the process and apparatus according to the invention, the magnitude of the effective signals coming from the various transmitters is not important. It is only significant whether or not they reach a certain threshold signal level. Taken in a wider sense, the transmitters generate always a signal which has the value of either 0 or 1 for the control unit 8. This is conventional with control units assembled of logical elements.

Upon the signals arriving at the inputs 16, 17, 18 the unit 14 generating the "enabling" signal (i.e., the output of the NAND gate IC4/2) does not release the enabling signal. The motor 1, after start-up has to slow to a speed not exceeding the idling speed in order to obtain an "enabling" signal on the control output.

Now, as the motor vehicle is stationary, the motor 1 is running at idling speed, the accelerator pedal 10 occupies its basic position, so the conditions of the safe start-up shifting of the motor vehicle are fulfilled. As a consequence, the "enabling" signal "E" appears, on the output of the NAND gate IC4/2 which is forwarded to the unit 15 producing the "control" signal.

Depending on the behavior of the driver, the unit 15 already may have received the control signal "V"—or receives it in this very instant—from one of the terminals I, II, D, R of the gear selecting switch 13. Selection of the proper terminal was already detailed earlier. For the sake of order it should be mentioned that in an actual apparatus according to the invention the signal coming from the gear selecting switch 13 may play two roles: Control signal "V" indicates only that a gear selection took place and, accordingly, the signal arriving at any of the inputs 19–22 will be evaluated equally after the diodes D1–D2. However, after the AND gates IC3/3 and IC3/4 the signal will be evaluated further as a "forward" or "reverse" signal.

When it is intended to start the vehicle, the driver depresses the accelerator pedal 10. As a consequence, the signal of the transmitter 11 also changes, resulting in the "command" signal P for switching the starting gear. In order that the change of the signal from the transmitter 11 not simultaneously alter the "enabling" signal on the output of the NAND gate IC4/2, the condenser C1 is provided, which retards the arrival of the new signal at the input of NAND gate. At the same time the flip-flop IC5 stores the existing "enabling" signal "E" and the control signal "V" as long, as the "command" signal P is not cancelled, i.e., as long as the driver continues to depress the accelerator pedal.

However, it frequently occurs, that although the driver does not want to stop, he returns the accelerator pedal into its basic position, as he wants to slow down the vehicle. He nevertheless wants to avoid the apparatus evaluating the conditions as being those of safe start-up shifting. Accordingly, the flip-flop IC6 is arranged to store the output signal of the flip-flop IC5 until the vehicle actually reaches a stationary condition.

Upon a signal leaving the flip-flop IC6, and a "forward" signal arriving from the gear selecting switch 13, the shift signal "KI" for advancing may leave the AND gate IC3/3. If, on the other hand, a "reverse" signal arrives from the switch 13, the AND gate IC3/4 generates the shift signal "KR" for the reverse gear.

Before the signal "KI" for forward shifting can become effective, the following further requirement must be met:

As already mentioned before, when the motor vehicle stops for reasons of traffic, the conventional automatic transmission switches back to the starting gear only, and not to "neutral". The creeping motion normally will be prevented by the driver by using the brake instead of switching the gear selecting switch 13 to "neutral". This technique involves a certain loss of fuel.

Energy saving operation can be achieved in the following manner, in accordance with the invention:

If the driver allows the accelerator pedal 10 to return in its basic position, and the velocity of the motor vehicle drops below a predetermined lower limit value (we chose 3 km/h for this purpose), the signal coming from the NAND gate IC4/1 suppresses the signal "KI" by means of the AND gate IC7. As a consequence, all the stages of the automatic transmission 2 will be disconnected (i.e., the transmission will shift to "neutral") and the vehicle will coast or free wheel. Upon a newer signal of the transmitter 11, indicating displacement of the accelerator, the inhibition on the AND gate IC7 is removed.

Figure 3:
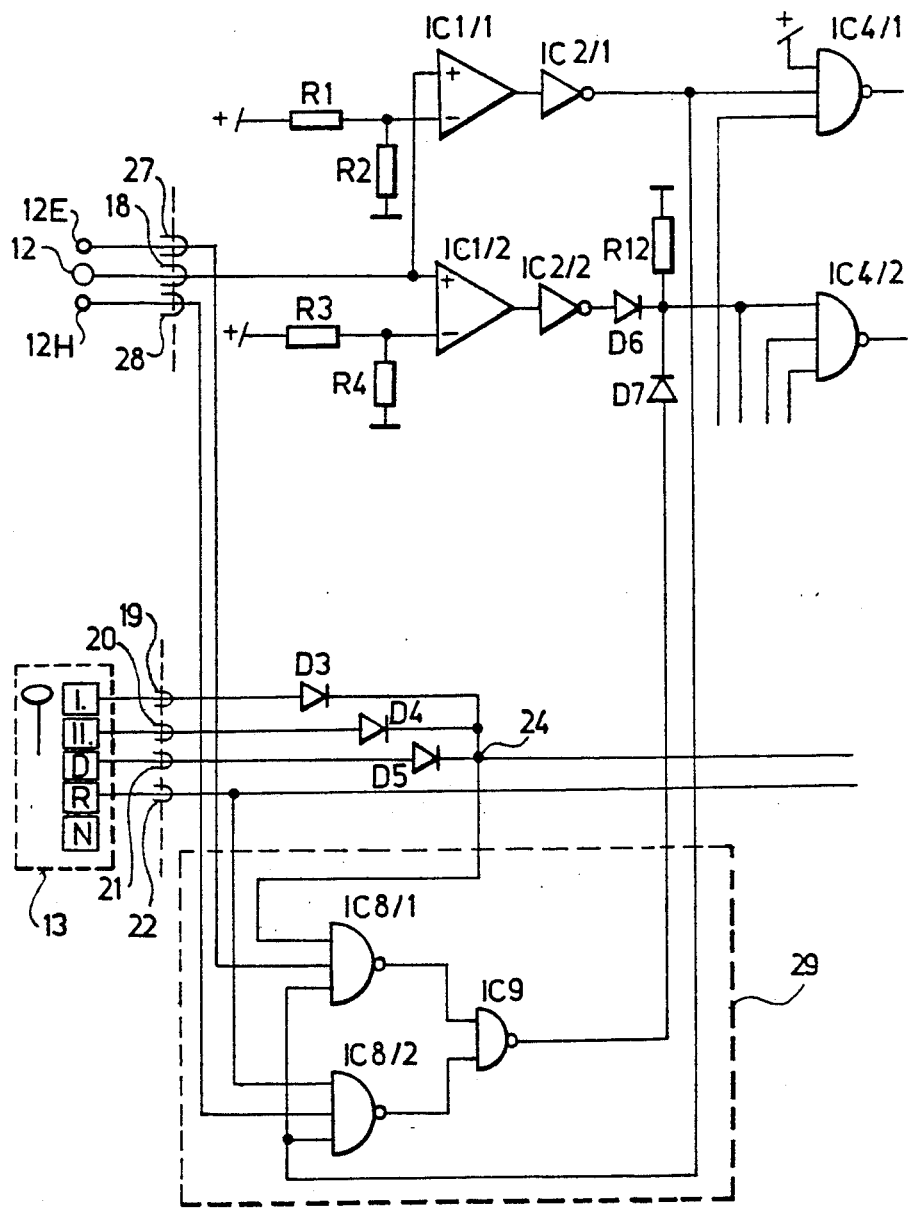
FIG. 3 shows the same for another embodiment of the apparatus according to the invention.

A further preferred mode of realization of the process according to the invention, and an alternative version of the apparatus, is illustrated in FIG. 3. This embodiment requires the same signal sources and electronic units, as the previously described embodiment. The difference lies in the design of the transmitter 12, for generating a signal representing the angular velocity of the wheel. In the FIG. 3 modification, this transmitter is provided with a detector 12E sensing the forward direction and with a detector 12H sensing the reverse direction. Both detectors are connected to the inputs 27 and 28, respectively, of the control unit 8. These inform about the direction of travel of the motor vehicle.

Some modifications can be observed in the control unit 8, too. These modifications are illustrated in FIG. 3 in which only the modified part of the apparatus according to FIG. 2 is shown.

In the FIG. 3 modification we may use further electronic elements for the control unit 8. These are as follows: A dual NAND gate unit with 2×3 inputs containing individual gates IC8/1–IC8/2, a quadruple NAND gate unit with two inputs, of which only one gate IC9 is utilized, diodes D6–D7 and the resistor R12.

The layout with the new elements is as follows:

The input 27 connected to the detector 12E sensing forward advance is connected to one of the inputs of the NAND gate IC8/1. The second input of the NAND gate IC8/1 is connected to the "forward" connection point 24, while the third input thereof is connected to the output of the invertor IC2/1. The output of the NAND gate IC8/I is connected to one of the inputs of the NAND gate IC9.

The input 28 associated with the detector 12H sensing reverse motion is connected to one of the inputs of the NAND gate IC8/2, while the second input of the gate IC8/2 is connected to the "reverse" input 22 of the gear selecting switch 13. The third input of the gate IC8/2 is connected to the output of the invertor IC2/1. The output of the NAND gate IC8/2 is connected to the other input of the NAND gate IC9.

The part, as detailed above, consisting of the NAND gates IC8/1, IC8/2 and IC9 forms the unit 29 sensing the state of motion, and the output thereof corresponds to the output of the NAND gate IC9.

Another change can be observed in the unit 14 of the control unit 8 which generates the "enabling" signal. The output of the invertor IC2/2 is connected to the diode D6 connecting the invertor IC2/2 with the input of the NAND gate IC4/2. The output of the diode D6 is connected through the diode D7 with the output of the NAND gate IC9 and with a grounded resistor R12.

With the modified version the process according to the invention is realized in the following manner:

As in the previously specified process, one of the prerequisites of safe start-up shifting is a stationary or nearly stationary state of the motor vehicle. For this purpose we chose the velocity of 1.5 km/h. However, situations may occur, in which this condition may represent a superfluous restriction, as where the driver intends to start the motor vehicle on a slope so that first he allows the vehicle to roll freely forward, and manipulations of starting are performed with the vehicle already in motion. Similarly, it is possible to start the motor vehicle when it is in a backward motion. Accordingly, if we are able to assure that only the starting gear should be switched which would correspond to the actual direction of motion of the motor vehicle, conditions of safe start-up shifting can be met even with the vehicle in motion above the limit speed.

If the motor vehicle moves for the above mentioned reasons, the signal coming from the transmitter 12 normally would disable the NAND gate IC4/2, such that there could not be an "enabling" signal. However, in the modified version, if the motor vehicle travels forwardly, the detector 12E generates a signal. If there is a reverse motion, the signal is generated by the detector 12H. This signal is compared in the unit 29 with the signals arriving from the gear selecting switch 13. By that means, it will be determined whether the starting gear intended to be switched by the driver corresponds to the actual direction of motion of the motor vehicle.

Accordingly, if the motor vehicle is rolling forwards, and the driver gives the command for switching the forward starting gear by switching the terminal I, II or D, a signal arrives from the output of the NAND gate IC9 to the input of the NAND gate IC4/2, which replaces the condition established by the signal of the transmitter 12. Accordingly, the proper signal will arrive to every input of the NAND gate IC4/2 and as a consequence the "enabling" signal appears on the output thereof.

If the motor vehicle rolls backwards and the terminal "R" is actuated, the unit 29 will replace the signal of the transmitter 12 in a similar way.

With the FIG. 3 apparatus detailed above, the transmitters transmitting the signal of the angular velocity of the wheels has been designed so, that forward and reverse motions are detected by individual transmitters, each generating a discrete signal. It goes without saying that the detector can be so designed that one instrument would generate a single signal and the change of this signal would express the different directions of motion. An embodiment is also possible, with which change of the sign of the analogous signal of the transmitter 12 refers to the direction of motion.

Recently a tendency can be observed, insofar as the busses should be provided with a brake system for the prevention of locking, the wheels of these types are normally provided with a tachometer. The signal of the tachometer, i.e. the angular velocity of the wheel is well suitable for assuring the signal needed in the basic processes. Taking into consideration that the difference between the angular velocities of the wheels on the two sides of the motor vehicle can be neglected from the point of view of our invention (max. 25% depending on the radius of the rotating circle), it suffices to utilize the signal of one of the tachometers. It goes without saying that by forming the average value of the angular velocities to be measured on both sides a more accurate value will be obtained. Also, these signals can be formed so as to give information on the direction of motion.

The process according to the invention does not protect only against the errors of the driver and wasting of fuel, but protection can be obtained against certain technical failures, such as sticking of the gas pedal.

What we claim:

1. A process for safe start-up shifting of a motor vehicle having an electro-hydraulic automatic transmission which comprises,
    (a) detecting the speed of movement of the vehicle, the speed of the engine, and the position of its accelerator pedal,
    (b) generating an "enabling" signal upon simultaneous sensing of a predetermined near-zero vehicle speed, idling speed of said engine, and of the rest position of said pedal,
    (c) detecting the setting of the transmission shift control for said vehicle and generating a "control"

signal in response to activating of said shift control into a "forward" or "reverse" condition, and (d) generating a "command" signal in response to the simultaneous existence of said "enabling" and "control" signals in combination with activation of said accelerator pedal away from its rest position, to effect start-up shifting of the transmission, (e) said start-up shifting of said transmission into a "forward" or "reverse" condition being blocked prior to the generation of said "command" signal.

2. A process according to claim 1, further characterized by (a) sensing the direction of motion of the vehicle and generating a first directional signal indicating said direction of movement, (b) generating a second directional signal indicating the "forward" or "reverse" direction of the setting of said transmission shift control, (c) generating a further signal when the speed of the vehicle is at or below a safe level above said predetermined near-zero speed, (d) generating an override signal in response to the first directional signal being consistent with the direction setting reflected by said second directional signal simultaneously with the existence of said third control signal, (e) said override signal permitting said "enabling" control signal to be generated while said vehicle is in motion at speeds in excess of said predetermined near-zero speed.

3. A process according to claim 1, further characterized by (a) generating a vehicle-coasting shift-control signal in response to the simultaneous existence of (i) an accelerator position at the rest position and (ii) forward speed of the vehicle below a predetermined low level, (b) generating a shift control output in response to the simultaneous absence of said vehicle-coasting shift-control signal and the presence of said command signal, to enable said transmission to be in a shifted drive condition, (c) said transmission being caused to be shifted into a neutral condition to enable coasting when return of said accelerator pedal to the rest position and the deceleration of said vehicle to a speed below said predetermined low level simultaneously occur.

4. Apparatus for the safe start-up shifting of a motor vehicle of the type having an internal combustion motor, an automatic transmission, a transmission control means, and a manual fuel control movable from an idle position through variable running positions, which comprises (a) a first sensor for detecting engine rotational speed,
(b) a second sensor for detecting vehicle motion,
(c) a third sensor for detecting the position of said fuel control,
(d) a fourth sensor for detecting the actuated condition of said transmission control means,
(e) a first control device responsive to said first sensor sensing an "idle" speed condition of said engine, together with said second sensor detecting vehicle motion below a first predetermined speed, together with said third sensor sensing an idle position of said fuel control, to generate a shift-enabling signal,
(f) a shift control device responsive to detecting a "forward" or "reverse" condition of said transmission control means for generating a control signal,
(g) shift output control means responsive to the simultaneous existence of said shift-enabling and said control signals, together with the actuation of said fuel control to a running position, to generate a shift output command signal for actuating said automatic transmission into a selected "forward" or "reverse" condition.

5. Apparatus according to claim 4, further characterized by, (a) additional sensing means for detecting the direction of movement of the vehicle,
(b) a motion override control device responsive to the simultaneous existence of (i) a signal from said additional sensing means, (ii) a signal from said fourth sensor indicating a transmission setting consistent with the direction of vehicle movement and (iii) a signal indicating vehicle movement within a predetermined safe speed greater than said first predetermined speed, for generating an override signal,
(c) said first shift-enabling control device being operable to generate said first shift-enabling signal notwithstanding the existence of wheel motion when said override signal is being generated.

6. Apparatus according to claim 4, further characterized by (a) coasting control input means for said shift output control for disabling said shift output control in response to return of said fuel control to its idle position and deceleration of said vehicle speed to below a second predetermined speed level above said first predetermined speed,
(b) said coasting control input means comprising said second and third sensing means,
(c) said coasting control input means being operative to disable said shift output control and cause said transmission to be shifted to "neutral" to allow free coasting of the vehicle independently of the selected setting of the transmission control means in response to the sensing of (i) fuel control means in a released position and (ii) vehicle motion below said second predetermined speed.

* * * * *